United States Patent
Bekal et al.

(10) Patent No.: US 10,060,796 B2
(45) Date of Patent: Aug. 28, 2018

(54) SYSTEMS AND METHODS FOR CORRECTION OF FREQUENCY SPECTRUM IN DUAL COMB SPECTROSCOPY

(71) Applicant: Morpho Detection, LLC, Newark, CA (US)

(72) Inventors: Anish Bekal, Bangalore (IN); Sameer Dinkar Vartak, Bangalore (IN); Rachit Sharma, Bangalore (IN)

(73) Assignee: MORPHO DETECTION, LLC, Newark, CA (US)

( * ) Notice: Subject to any disclaimer, the term of this patent is extended or adjusted under 35 U.S.C. 154(b) by 127 days.

(21) Appl. No.: 15/137,564

(22) Filed: Apr. 25, 2016

(65) Prior Publication Data

US 2017/0307443 A1    Oct. 26, 2017

(51) Int. Cl.
  *G01J 3/433* (2006.01)
  *G01J 3/28* (2006.01)
  *G01J 3/02* (2006.01)

(52) U.S. Cl.
  CPC ........... *G01J 3/4338* (2013.01); *G01J 3/0218* (2013.01); *G01J 3/2803* (2013.01)

(58) Field of Classification Search
  CPC ................................ G01J 3/4338; G01J 3/433
  See application file for complete search history.

(56) References Cited

U.S. PATENT DOCUMENTS

| | | | | |
|---|---|---|---|---|
| 6,831,935 | B2 * | 12/2004 | Ye | H01S 3/1109 372/18 |
| 7,940,390 | B2 * | 5/2011 | Kaertner | G01J 11/00 250/339.06 |
| 8,384,990 | B2 | 2/2013 | Vodopyanov et al. | |
| 8,564,785 | B2 | 10/2013 | Newbury et al. | |
| 8,625,101 | B2 | 1/2014 | Giaccari et al. | |
| 8,693,004 | B2 | 4/2014 | Chandler et al. | |
| 9,046,462 | B2 | 6/2015 | Pate et al. | |
| 2003/0185255 | A1 * | 10/2003 | Ye | H01S 3/1109 372/18 |

(Continued)

FOREIGN PATENT DOCUMENTS

| | | | |
|---|---|---|---|
| CN | 103399447 A | 11/2013 | |
| WO | WO 2015193282 A1 * | 12/2015 | ............... G01J 3/10 |

OTHER PUBLICATIONS

Ideguchi, Takuro et al., Adaptive real-time dual-comb spectroscopy, Nature Communications, Article, Feb. 7, 2014, pp. 1-14, vol. 5, No. 3375.

*Primary Examiner* — Kara E Geisel
*Assistant Examiner* — Violeta A Prieto
(74) *Attorney, Agent, or Firm* — Armstrong Teasdale LLP

(57) ABSTRACT

A method for correcting frequency offset in a dual comb spectroscopy system is provided. The method includes causing a first laser (L1) generator to transmit L1 pulses at a repetition rate of a first frequency and causing a second laser (L2) generator to transmit L2 pulses at a repetition rate of a second frequency. The method also includes interrogating a reference material using a combination of the L1 pulses and the L2 pulses and capturing reference cell pulses. The method further includes interrogating a material of interest using the L1 pulses and capturing material of interest pulses. The method includes determining a frequency jitter based on the captured reference cell pulses and the combination of the captured material of interest pulses and the L2 pulses.

20 Claims, 5 Drawing Sheets

(56) References Cited

U.S. PATENT DOCUMENTS

2010/0045974 A1* 2/2010 Kaertner .................. G01J 11/00
                                                        356/218
2011/0069309 A1* 3/2011 Newbury ................ G01J 3/453
                                                        356/326
2013/0342836 A1* 12/2013 Newbury ............... G01J 3/453
                                                        356/326
2017/0201328 A1* 7/2017 Hugi ...................... H04B 10/64

* cited by examiner

SYSTEMS AND METHODS FOR CORRECTION OF FREQUENCY SPECTRUM IN DUAL COMB SPECTROSCOPY

BACKGROUND

The embodiments described herein relate generally to dual comb spectroscopy, and more particularly, to correcting frequency offset jitter in a dual comb spectroscopy system.

Known spectroscopy systems, such dual comb spectroscopy systems, are designed to measure light that is emitted, absorbed, or scattered by test materials, such as various gas concentrations. Moreover, many conventional dual comb spectroscopy systems rely on lasers to determine the composition and concentrations of gas concentrations. However, conventional dual comb spectroscopy systems experience carrier envelope frequency offset fluctuations that cause the dual comb spectroscopy spectrum to jitter and introduce errors into the resulting measurements. To compensate and correct for this jitter, known techniques include using an ultra-stabilized comb that requires costly computationally intensive electronics and f-2f interferometry systems. Other known spectroscopy systems utilize expensive narrow line bandwidth reference lasers and costly computationally intensive electronics to determine jitter in the dual comb spectroscopy spectrum. Yet another conventional system generates a frequency comb using a difference frequency generation technique that requires expensive high powered lasers. However, known dual comb spectroscopy systems remain difficult to design, limited in precision, and prohibitively expense to build.

BRIEF SUMMARY

In one aspect, a method for correcting frequency offset in a dual comb spectroscopy system is provided. The method includes causing a first laser (L1) generator to transmit L1 pulses at a repetition rate of a first frequency and causing a second laser (L2) generator to transmit L2 pulses at a repetition rate of a second frequency. The second frequency is different from the first frequency. The method also includes interrogating a reference material using a combination of a first portion of the L1 pulses and of a first portion of the L2 pulses and capturing reference cell pulses that include the combination of the first portion of the L1 pulses and of the first portion of the L2 pulses that interrogated the reference material. The method further includes interrogating a material of interest using a second portion of the L1 pulses and capturing material of interest pulses that include the second portion of the L1 pulses that interrogated the material of interest. The method includes determining a frequency jitter based on the captured reference cell pulses and the combination of the captured material of interest pulses and a second portion of the L2 pulses.

In another aspect, a frequency offset correction system for correcting frequency offset in a dual comb spectroscopy system is provided. The frequency offset correction system includes a first laser (L1) generator configured to transmit L1 pulses at a repetition rate of a first frequency and a second laser (L2) generator configured to transmit L2 pulses at a repetition rate of a second frequency. The second frequency is different from the first frequency. The frequency offset correction system further includes a first combiner configured to combine a first portion of the L1 pulses and a first portion of the L2 pulses to interrogate a reference material. The frequency offset correction system also includes a reference detector configured to capture reference material pulses that include a combination of the first portion of the L1 pulses and the first portion of the L2 pulses that interrogated the reference material. The frequency offset correction system includes an interrogation detector configured to capture material of interest pulses that include a second portion of the L1 pulses that interrogated the material of interest. The frequency offset correction system includes a controller configured to cause the first laser generator and the second laser generator to correct for frequency offset of the L1 pulses and the L2 pulses, respectively, based on the captured reference material pulses and the captured material of interest pulses.

In yet another aspect, a controller for correcting frequency offset in a dual comb spectroscopy system is provided. The controller includes a processor coupled to a memory device. The controller is configured to correct frequency offset by causing a first laser (L1) generator to transmit L1 pulses at a repetition rate of a first frequency and causing a second laser (L2) generator to transmit L2 pulses at a repetition rate of a second frequency. The second frequency is different from the first frequency. The controller is configured to correct frequency offset by capturing reference cell pulses that include the combination of the first portion of the L1 pulses and the first portion of the L2 pulses that interrogated a reference material and capturing material of interest pulses that include the second portion of the L1 pulses that interrogated a material of interest. The controller is configured to correct frequency offset by determining a frequency jitter based on the captured reference cell pulses and the combination of the captured material of interest pulses and a second portion of the L2 pulses and determining whether the determined frequency jitter exceeds a predetermined jitter threshold. The controller is configured to correct frequency offset by causing a change in at least one of a pump power of the first laser generator and a pump power of the second laser generator in response to the determined frequency jitter exceeding the predetermined jitter threshold.

BRIEF DESCRIPTION OF THE DRAWINGS

FIG. 1 is a schematic diagram of an exemplary system for correcting frequency offset in a dual comb spectroscopy system;

FIG. 2 is a graphical view in the frequency domain in terms of wavelength of an output of an interrogation comb generated by an interrogation laser generator shown in FIG. 1;

FIG. 3 is a graphical view in the frequency domain in terms of wavelength of an overlay of a captured interrogation comb shown in FIG. 2 and of an exemplary reference comb generated by a reference laser generator shown in FIG. 1;

FIG. 4 is a graphical view in the frequency domain in terms of frequency of an exemplary absorption spectrum of a material of interest based on interrogation comb and reference comb shown in FIG. 3;

FIG. 5 is a graphical view of three graphs representing three steps performed by the system shown in FIG. 1;

FIG. 6 is a schematic diagram of another exemplary system embodiment for correcting frequency offset in a dual comb spectroscopy system; and FIG. 7 is a schematic diagram of yet another exemplary system embodiment for correcting frequency offset in a dual comb spectroscopy system.

DETAILED DESCRIPTION

Figure 1:
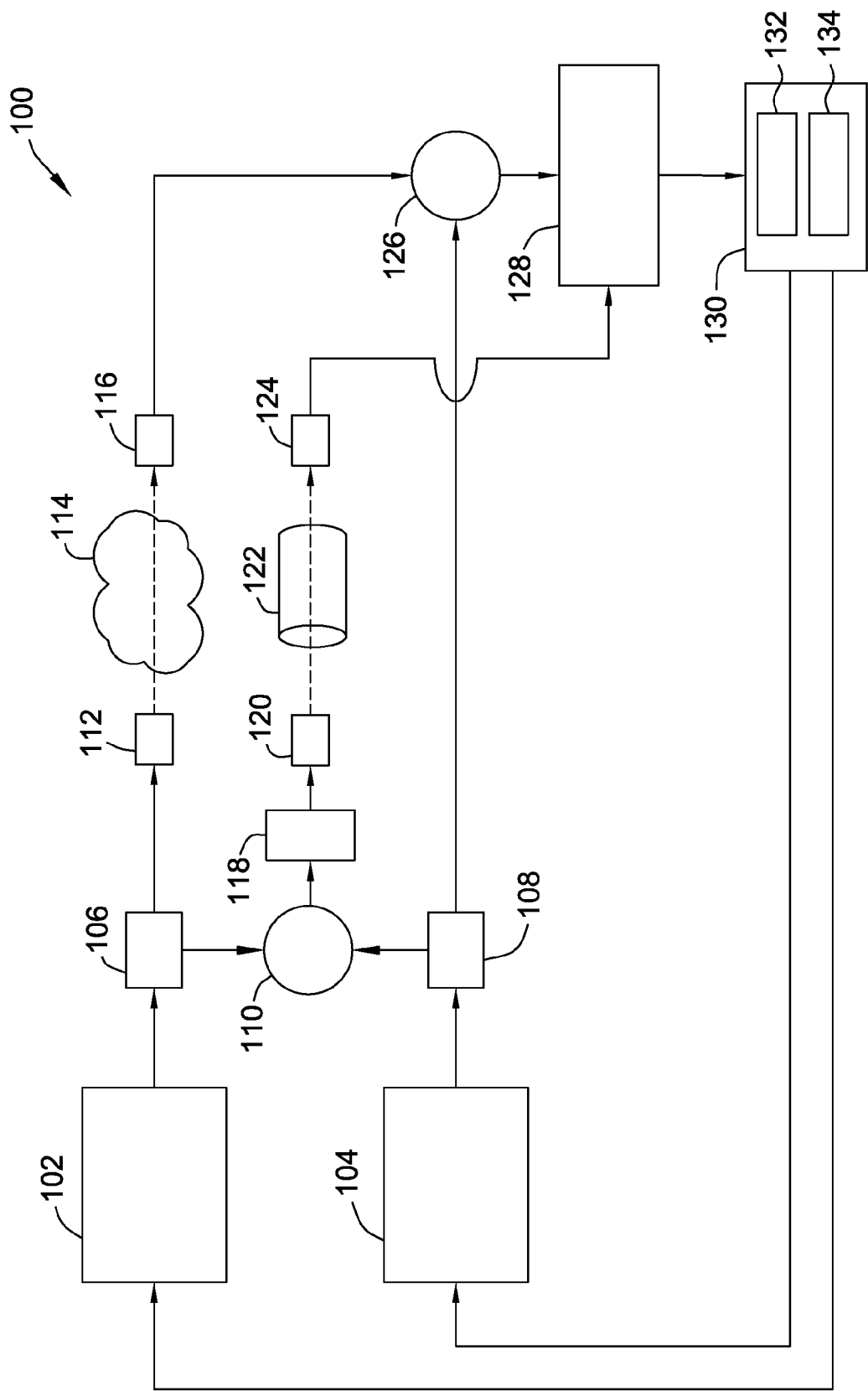
FIGS. 1-7 show exemplary embodiments of the systems and methods described herein.

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations are combined and interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The correction systems and methods described herein facilitate carrier envelope frequency offset (CEFO) jitter correction in a dual comb spectroscopy system in a substantially real-time manner. The system described herein includes an interrogation laser that transmits light pulses at a repetition rate of a particular frequency. Moreover, the system includes a local oscillator (LO) laser that transmits light pulses at a repetition rate of a different frequency from the pulse repetition rate frequency emitted by the interrogation laser. An interrogation splitter and a LO splitter may split the pulses or beams of the interrogation laser and the LO laser in any portion, respectively. A portion of the pulses of the interrogation laser may be directed into a collimator and used to interrogate a material of interest, such as without limitation, a particular concentration and pressure of a known or preselected gas. An interrogation detector captures these pulses after passing through and interrogating the material of interest. These captured material of interest pulses are combined with a portion of the pulses of the LO laser and provided to a data acquisition unit. Moreover, a reference combiner combines equal portions of the pulses of the interrogation laser and of the pulses of the LO laser to interrogate a reference material and directs the combination pulses to be used to interrogate a reference material, such as a known gas at a predetermined concentration and pressure. A reference detector captures the reference material pulses after passing through and interrogating the reference material and provides the captured reference material pulses to the data acquisition unit. A controller determines the CEFO based on the captured reference material pulses and the captured material of interest pulses and calculates a jitter value based on the determined CEFO. If the jitter value exceeds a predetermined threshold, the controller causes the first laser and the second laser to correct for the calculated jitter of the L1 pulses and the L2 pulses, respectively.

FIG. 1 is a schematic diagram of an exemplary frequency offset correction system 100 for correcting frequency offset in a dual comb spectroscopy system, which includes an interrogation laser generator 102 and a reference laser generator 104. Either laser generator 102, 104 may include, for example and without limitation, a mode-locked femtosecond laser, fiber lasers, or any suitable type of laser. Both interrogation laser generator 102 and reference laser generator 104 includes a corresponding comb generator (not shown) that facilitates generating a frequency comb at a particular repetition rate of a particular frequency. Either comb generator may cause a corresponding laser generator to generate a frequency comb through the stabilization of the pulse train of the laser for example. In the exemplary implementation, the frequency of the comb for interrogation laser generator 102 is different from the frequency of reference laser generator 104.

Figure 2:
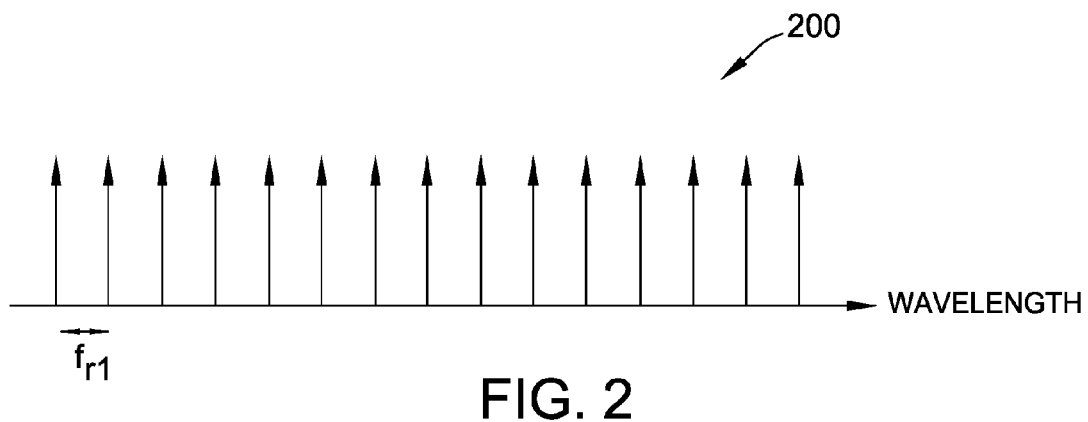

For example, FIG. 2 is a graphical view in the frequency domain in terms of wavelength of a frequency comb that is generated by interrogation laser generator 102. FIG. 2 includes a comb graph 200 that includes a y-axis defining a linear representation of amplitude (i.e., absorbance or lack thereof) of each pulse at a particular wavelength. The graph 200 also includes an x-axis defining a linear representation of wavelength for a plurality of pulses at different wavelengths that are equally separated by a fixed wavelength (or frequency). As shown in FIG. 2, each pulse of the frequency interrogation comb (generated by the interrogation laser generator 102) is separated by a fixed frequency $f_{r1}$.

Referring back to FIG. 1, interrogation laser generator 102 may be optically coupled to an interrogation splitter 106 through fiber optic cable, line sight, or the like. Interrogation splitter 106 is optically coupled with a laser combiner 110 and with a collimator 112 that directs the interrogation pulse into a material of interest 114. Collimator 112 may include, for example and without limitation, plates, lenses, or any other device that narrows or directs light into material of interest 114. Interrogation splitter 106 may split the laser pulses or beams from interrogation laser generator 102 into any number of portions by any ratio based on power, energy, or any other suitable characteristic of the pulses or beam. For example and without limitation, interrogation splitter 106 splits the interrogation pulse into a 9:1 ratio, such that 90% of the power of the interrogation pulse is directed to the interrogation of material of interest 114 and 10% of the power of the interrogation pulse is directed to laser combiner 110. Splitter 106 may also split the interrogation pulse, for example, in a 0-30% portion and a corresponding 70-100% portion. In some embodiments, material of interest 114 can be a gas of any concentration at any pressure. An interrogation detector 116 captures the portion of interrogation laser pulses that passes through material of interest 114 and directs the captured interrogation pulses (i.e., the pulses that interrogated material of interest 114) to a data acquisition combiner 126 through a fiber optic cable or any other means conveys light.

Reference laser generator 104 may be optically coupled to a reference splitter 108 through a fiber optic cable, for example and without limitation. Reference splitter 108, similar to interrogation splitter 106, may split the laser pulses or beams from reference laser generator 104 into any number of portions by any ratio based on power, energy, or any other suitable characteristic of the pulses or beam. For example and without limitation, reference splitter 108 splits the reference pulse into a 9:1 ratio, such that 90% of the power of the reference pulse is directed to the data acquisition combiner 126 and 10% of the power of the interrogation pulse is directed to laser combiner 110. Splitter 108 may also split the reference pulse, for example, in a 0-30% portion and a corresponding 70-100% portion. In turn, data acquisition combiner 126 may combine, in any suitable manner, the captured interrogation pulses from interrogation detector 116 and the portion of the reference pulses from reference splitter 108.

As described above, laser combiner 110 combines, in any suitable manner, the portion of the interrogation pulses from interrogation splitter 106 and the portion of the reference pulses from reference splitter 108 and directs the combination of both pulses or beams to a filter 118. For example and without limitation, filter 118 may include a Fabry-Pérot filter or any other suitable filter. In some embodiments, the filtered pulses or beam may be directed to a reference collimator 120 to narrow or to direct the combined pulses into a reference cell 122 of a known material. Alternatively, the combined pulses may be directed to reference cell 122. The known material disposed in reference cell 122 may include a predetermined gas having well known properties at a particular concentration and at a specific pressure that result in a known spectroscopy spectrum signature. In some implementations, reference cell 122 may be filled with a known gas at a high centration and at low pressure to facilitate more precise spectroscopy measurements.

Figure 3:
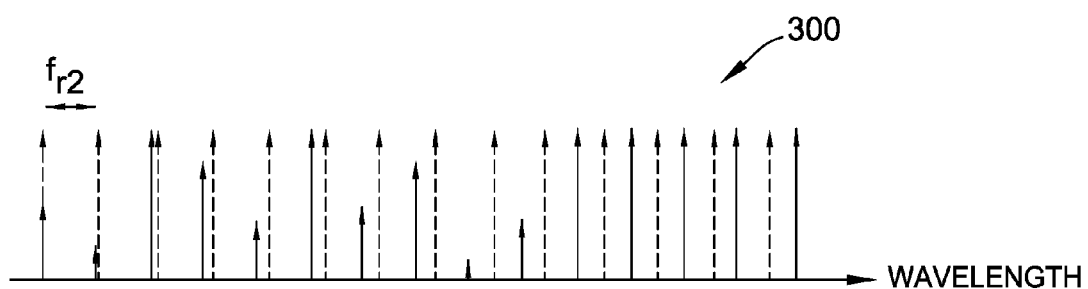

For example, FIG. 3 is a graphical view in the frequency domain in terms of wavelength of one captured interrogation comb that has passed through a material of interest 114 (shown in solid lines) and a reference comb (shown in dashed lines and as described above and in FIG. 2) generated by reference laser generator 102. FIG. 3 includes a graph 300 of two overlaid frequency combs that includes a y-axis defining a linear representation of amplitude (i.e., absorbance or lack thereof) of each pulse of either of the two combs shown at a particular wavelength. The graph 300 also includes an x-axis defining a linear representation of wavelength for two combs in which each comb a plurality of pulses at different wavelengths that are equally separated by a fixed wavelength (or frequency). For example, as shown in FIG. 3, each pulse of the reference comb (generated by the reference laser generator 104) is separated by a fixed frequency $f_{r2}$. In some embodiments, such as shown in FIG. 3, the repetition rate of the frequency $f_{r2}$ of the reference comb is slightly larger than the repetition rate of the frequency $f_{r1}$ of the interrogation comb. In other words, the "distance" (in terms of frequency) between each pulse of the reference comb is slightly larger than the "space" between each pulse of the interrogation comb. For example and without limitation, interrogation laser generator 102 may generate a frequency comb that includes a 100 MHz (i.e., frequency $f_{r1}$) between pulses and reference laser generator 104 may generate a frequency comb that includes 100.0005 MHz (i.e., frequency $f_{r2}$) between pulses. As a result, in continuing this example, the difference $f_d$ between the two frequencies is 500 Hz. This difference $f_d$ is used to determine section durations as part of a process step of the methods and algorithms as discussed below Referring back to FIG. 1, the reference pulses are captured by a reference detector 124 after passing through reference cell 122 containing the known reference material. Reference detector 124 directs the captured reference pulses to data acquisition unit 128 that performs signal processing on both captured pulses. Data acquisition unit 128 maintains time synchronization between the acquisition of both captured pulses and may convert the captured pulses into an electronic, digital form of the captured pulse data.

A controller 130 is communicatively coupled to and receives data from data acquisition unit 128. Controller 130 includes a memory device 132 communicatively coupled with a processor 134. Processor 134 is configured to execute instructions stored in memory device 132 that implements one or more signal processing and control methods, algorithms, or processes, as described herein. In the example embodiment, implementation of the jitter correction method includes multiple computational steps. It is understood that either controller 130 and/or data acquisition unit 128 may perform any of the data processing steps described herein.

Processor 134 may include one or more processing units (e.g., in a multi-core configuration). Further, processor 134 may be implemented using one or more heterogeneous processor systems in which a main processor is present with secondary processors on a single chip. In another illustrative example, processor 134 may be a symmetric multi-processor system containing multiple processors of the same type. Further, processor 134 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary implementation, memory device 132 is one or more devices that enable information such as executable instructions and/or other data to be stored and retrieved. Memory device 132 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM), a solid state disk, and/or a hard disk. The above memory types are example only, and are thus not limiting as to the types of memory usable for storage of a computer program. Memory device 132 may be configured to store, without limitation, jitter correction algorithm instructions, captured pulse data, and/or any other type of data.

In the exemplary implementation, controller 130 includes a media output (not shown) that is coupled to processor 134. Media output presents information to a user. For example, media output may include a display adapter (not shown) that may be coupled to a display device, such as a cathode ray tube (CRT), a liquid crystal display (LCD), an organic LED (OLED) display, and/or an "electronic ink" display. In some implementations, media output includes one or more display devices.

In the exemplary implementation, controller 130 includes a user input interface (not shown). User input interface is coupled to processor 134 and receives input from a user. User input interface may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of media output and user input interface.

In any event, controller 130 as described herein is configured to receive captured reference pulse data and captured interrogation pulse data and to process the pulse data to correct jitter. Advantageously, frequency offset correction system 100 utilizes the captured reference pulses from reference cell 122 to determine and correct jitter in a more reliable, cost effective, and less complicated manner. Furthermore, data acquisition unit 128 is configured to correct jitter without the need to sample a system oscillator or clock, which allows frequency offset correction system 100 to operate more reliably and more precisely in processing more data in real-time.

Figure 4:
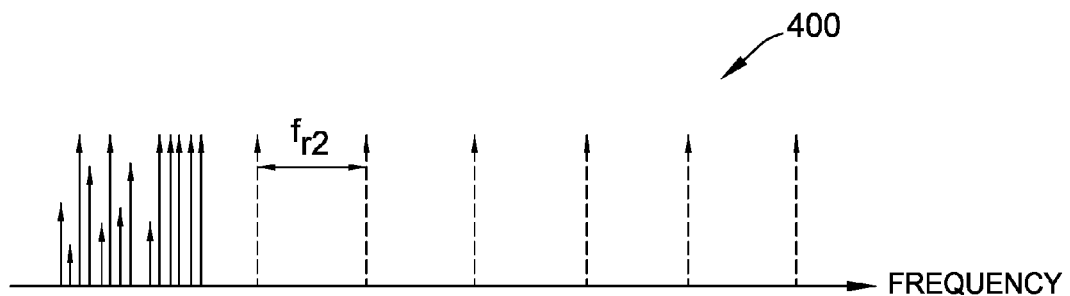

To achieve this jitter correction method or algorithm, controller 130 receives the reference pulse data from the data acquisition unit 128 that processes the reference pulses into reference pulse data. As described above, this reference pulse data includes data regarding captured reference pulses that interrogated the known gas within reference cell 122. Controller 130 parses the reference pulse data into sections S1, S2, S3, etc. in the time domain by a time duration equal to the inverse of the difference in frequency $f_d$ between the two frequency combs, $f_{r1}$ and $f_{r2}$, generated by interrogation laser generator 102 and reference laser generator 104. Controller 130 performs the Fourier transform (or any other suitable transform) using a fast-Fourier transform algorithm (or any other suitable algorithm) on each section S1, S2, S3, etc. For example, FIG. 4 is a graphical view in the frequency domain of one captured interrogation comb that has undergone a Fourier transform for each section. FIG. 4 includes a graph 400 of the multiplication of two overlaid frequency combs that includes a y-axis defining a linear representation of amplitude (i.e., absorbance or lack thereof) of each pulse of either of the two combs shown at a particular wavelength. The graph 400 also includes an x-axis defining a linear representation of frequency for the multiplication of the two combs.

The method performed by controller 130 may use the first section S1 as a baseline or reference section in cross correlating each subsequent section S2, S3, etc. The cross correlation of each section S2, S3, etc. with the first section S1 indicates a time lag between each section. Additionally or alternatively, controller 130 may calculate frequency lags for each section using the generated cross correlation data. With these calculated frequency lags, controller 130 is configured to determine the offset shift needed for the frequency spectrum to eliminate any jitter issues. This offset shift is equal to the jitter or drift exhibited by some lasers. Moreover, each section may be averaged to obtain a high signal-to-noise ratio in determining the absorption spectra. Controller 130 may determine calibration factors regarding absolute marker frequency and separation between frequency points of Fourier spectrum because the exact wavenumber of each absorption line of the reference gas within the reference cell 122 are known.

Furthermore, controller 130 receives the interrogation pulse data from the data acquisition unit 128 that processes the interrogation pulses into interrogation pulse data. As described above, this interrogation pulse data includes data regarding both the captured interrogation pulses that interrogated material of interest 114 and the reference pulses from the reference splitter 108. Controller 130 parses the interrogation pulses into sections of the same duration (i.e., frequency $f_d$), similar to the section parsing of the reference pulse data. Controller 130 performs the Fourier transform on each section related to the interrogation pulse data and shifts the frequency spectrum of the interrogation pulse sections by the jitter or shift calculated from the reference pulse data, as described above. For example and without limitation, controller 130 may determine whether the calculated jitter or shift exceeds a predetermined threshold. If the calculated jitter does exceed the predetermined threshold over a specific time duration, controller 130 determines a control command intended for interrogation laser generator 102 and/or reference laser generator 104 and transmits the determined control command accordingly to correct the jitter. This correction of the jitter may include a command that causes the adjustment of the pump power for interrogation laser generator 102 and/or reference laser generator 104 when the calculated jitter exceeds the predetermined threshold.

Figure 5:
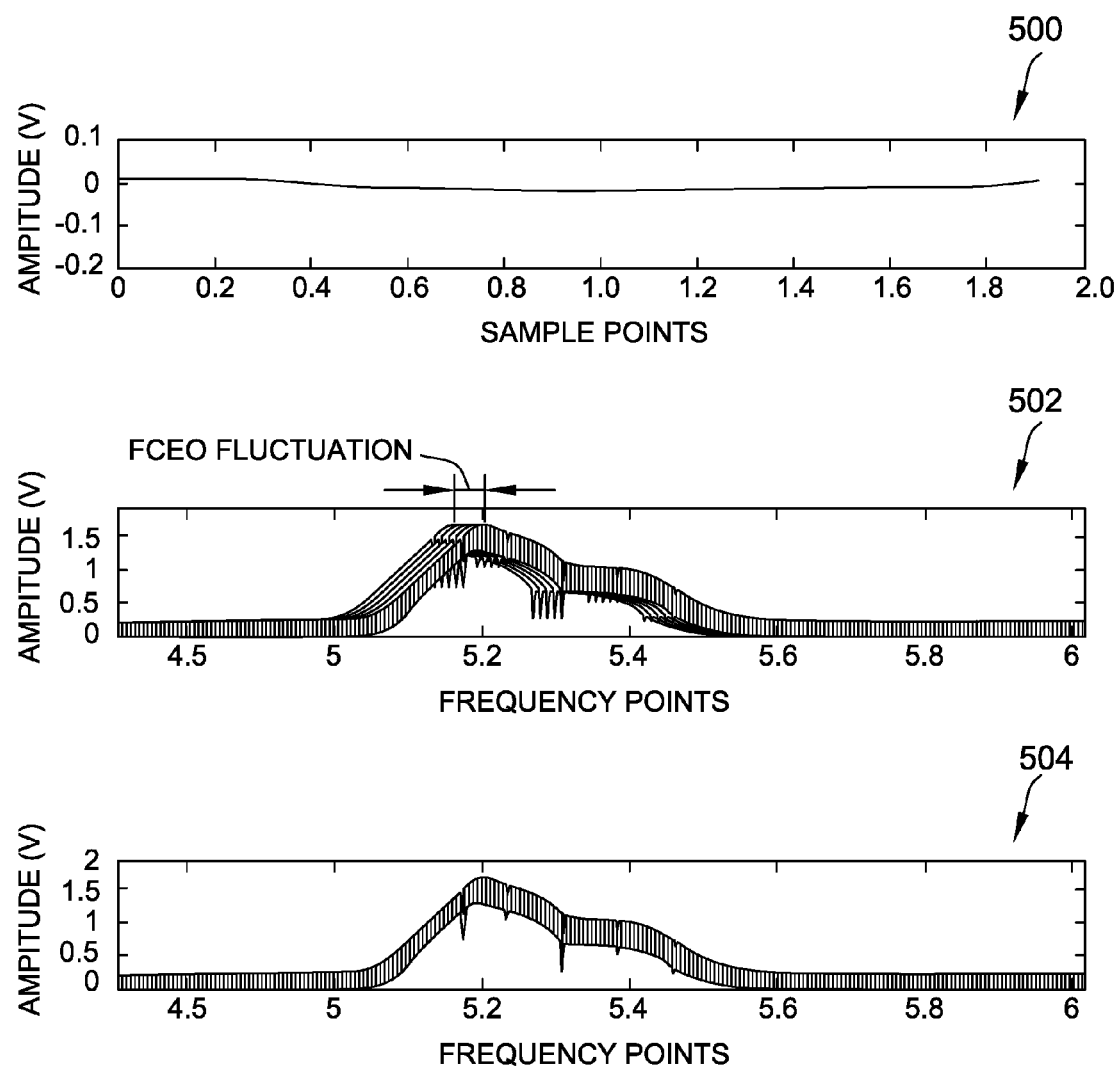

FIG. 5 is a graphical view of three different graphs representing three different steps performed by controller 130 and/or data acquisition unit 128. FIG. 5 includes graphs 500, 502, 504 that each include a y-axis defining a linear representation of amplitude (i.e., absorbance or lack thereof). The graph 500 includes an x-axis defining a linear representation of sample points acquired by the data acquisition unit 128. The graphs 502, 504 include an x-axis defining a linear representation of frequency points transformed by data acquisition unit 128 or controller 130. Graph 502 represents the frequency spectrum of the transformed samples and shows the CEFO fluctuation occurring within one or both of the laser generators 102, 104 without any jitter correction implemented. Graph 504 represents the result of the implementation of the jitter correction method or algorithm.

Figure 6:
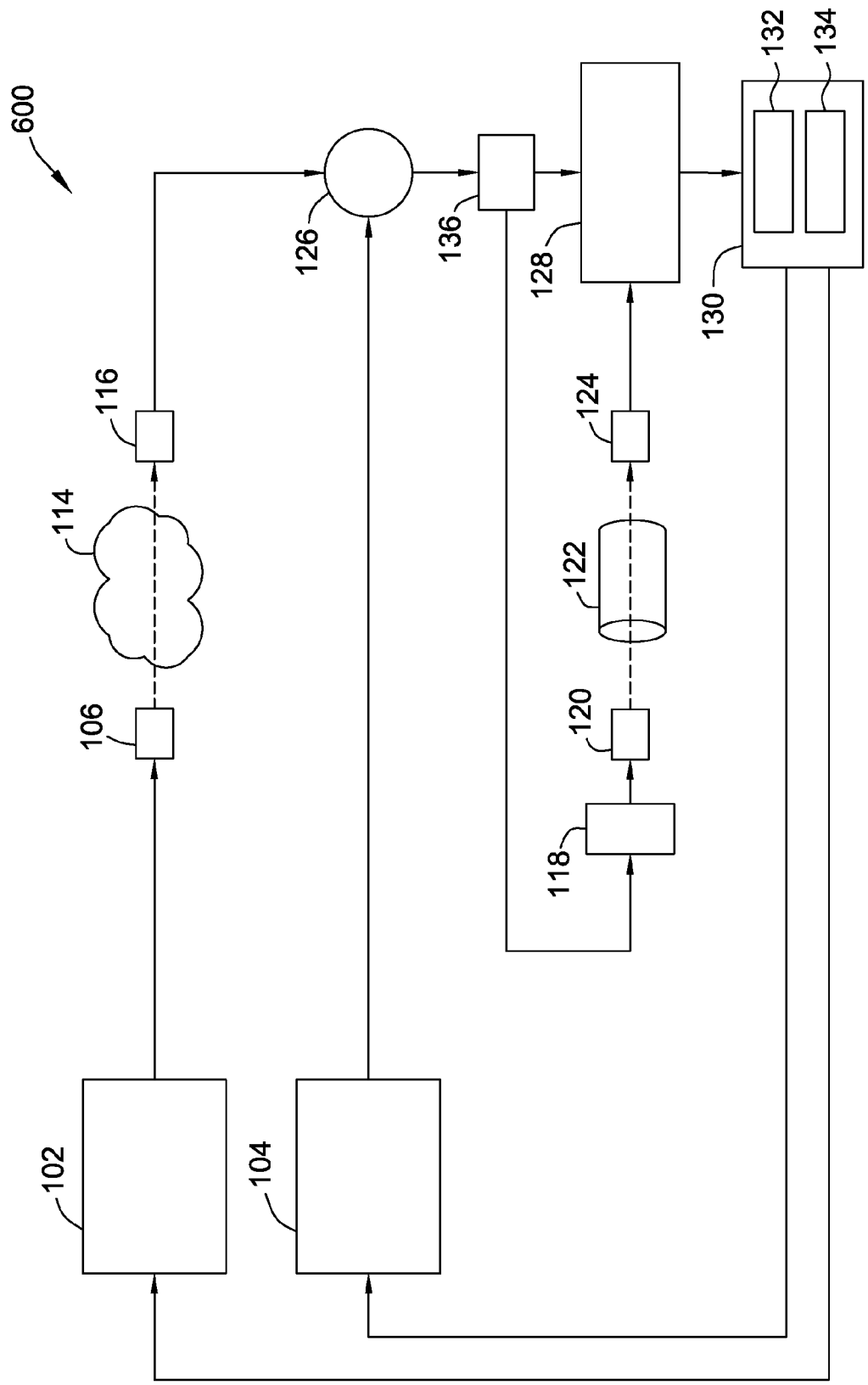

FIG. 6 is a schematic diagram of another embodiment for correcting frequency offset in a dual comb spectroscopy system 600. While system 600 shown in FIG. 6 is similar to system 100 in FIG. 1, system 600 includes a combiner 126 that combines the captured interrogation pulses (that interrogate material of interest 114) and the reference pulses from reference laser generator 104. For example and without limitation, combiner 126 combines the captured interrogation pulses and the reference pulses at a 1:1 ratio and directs the combined pulses to a splitter 136. Splitter 136 splits the combined pulses into two equal portions, for example and without limitation, and directs one portion to data acquisition unit 128 and the other portion to the branch of reference cell 122 and ultimately to data acquisition unit 128. The remaining steps performed by data acquisition unit 128 and/or controller 130 are similar to system 100 shown in FIG. 1.

Figure 7:
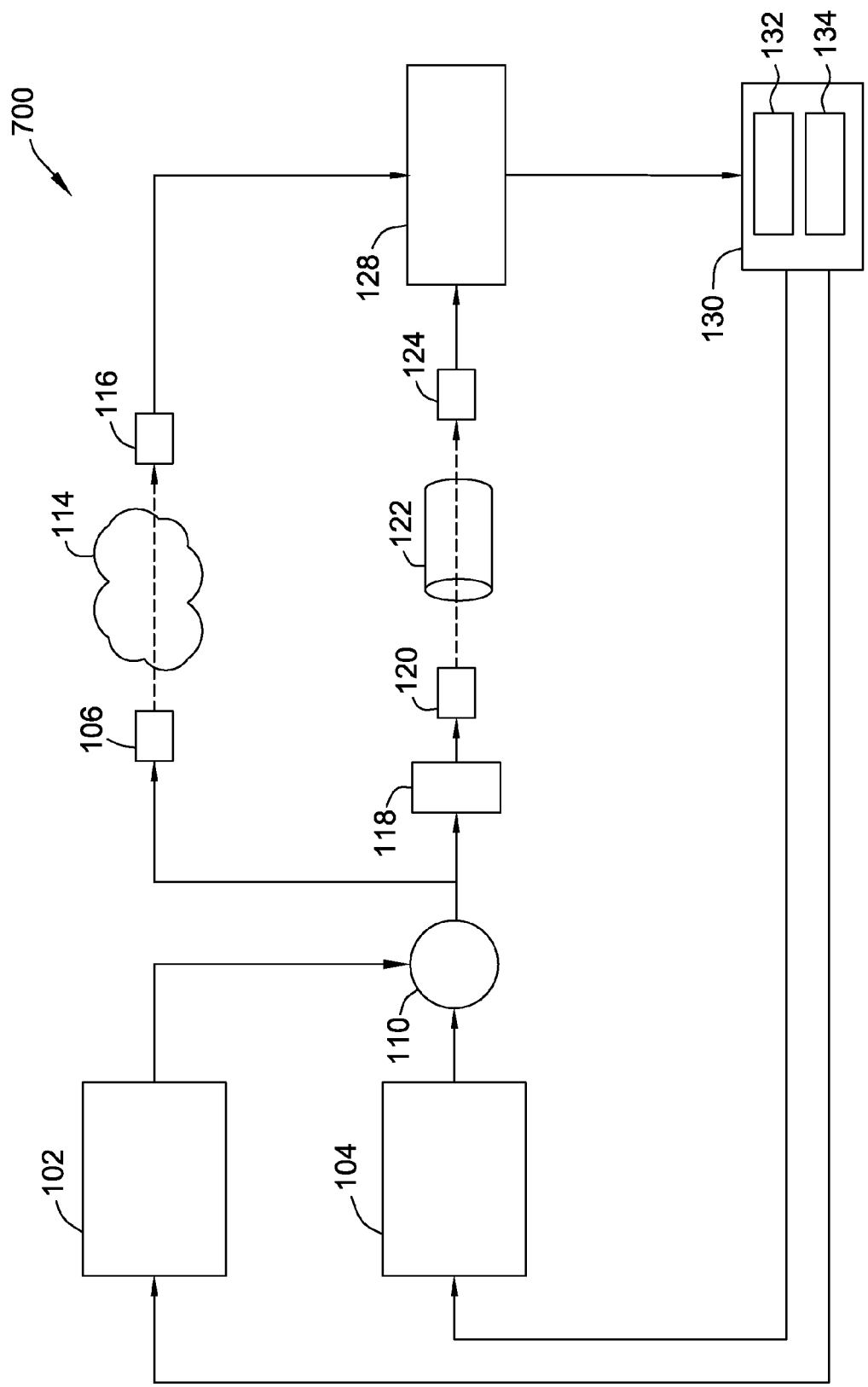

FIG. 7 is a schematic diagram of yet another embodiment for correcting frequency offset in a dual comb spectroscopy system 700. While system 700 shown in FIG. 7 is similar to system 100 in FIG. 1, system 700 includes only laser combiner 110 that combines the interrogation pulses from interrogation laser generator 102 and the reference pulses from reference laser generator 104. For example and without limitation, laser combiner 110 combines the interrogation pulses and the reference pulses at a 1:1 ratio and directs the combined pulses to both material of interest 114 branch and reference cell 122 branch. The output of both branches are directed to data acquisition unit 128. The remaining steps performed by data acquisition unit 128 and/or controller 130 are similar to system 100 shown in FIG. 1.

A computer, such as those described herein, includes at least one processor or processing unit and a system memory. The computer typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Exemplary embodiments of methods and systems are described above in detail. The methods and systems are not limited to the specific embodiments described herein, but rather, components of systems and/or steps of the methods may be used independently and separately from other components and/or steps described herein. Accordingly, the exemplary embodiment can be implemented and used in connection with many other applications not specifically described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose various embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for correcting frequency offset in a dual comb spectroscopy system, said method comprising:
    causing a first laser (L1) generator to transmit L1 pulses at a repetition rate of a first frequency;
    causing a second laser (L2) generator to transmit L2 pulses at a repetition rate of a second frequency, the second frequency different from the first frequency;
    interrogating a reference material using a combination of a first portion of the L1 pulses and a first portion of the L2 pulses;
    capturing reference cell pulses that include the combination of the first portion of the L1 pulses and the first portion of the L2 pulses that interrogated the reference material;
    interrogating a material of interest using a second portion of the L1 pulses;
    capturing material of interest pulses that include the second portion of the L1 pulses that interrogated the material of interest; and
    determining a frequency jitter based on the captured reference cell pulses and the combination of the captured material of interest pulses and a second portion of the L2 pulses.

2. The method of claim 1, wherein interrogating the material of interest includes interrogating the material of interest using the second portion of the power of the L1 pulses, wherein the second portion is 70-100%.

3. The method of claim 1, wherein interrogating the reference material includes interrogating the reference material using a combination of the first portion of the power of the L1 pulses and the first portion of the power of the L2 pulses, wherein the first portion of the power of the L1 pulses is 0-30% and the first portion of the power of the L2 pulses is 0-30%.

4. The method of claim 1, wherein interrogating the reference material includes interrogating the reference material at a predetermined concentration and a predetermined pressure.

5. The method of claim 1, wherein determining the frequency jitter includes determining the frequency jitter by transforming a plurality sections of the captured reference cell pulses and by cross-correlating each section with a first of the plurality of section of the capture reference cell pulses.

6. The method of claim 5, further comprising applying the determined frequency jitter to the combination of the captured material of interest pulses and a second portion of the L2 pulses.

7. The method of claim 6, further comprising determining whether the determined frequency jitter exceeds a predetermined jitter threshold.

8. The method of claim 7, further comprising causing a change in a pump power of said first laser generator in response to the determined frequency jitter exceeded the predetermined jitter threshold.

9. The method of claim 7, further comprising causing a change in a pump power of said second laser generator in response to the determined frequency jitter exceeded the predetermined jitter threshold.

10. The method of claim 8, wherein determining whether the determined frequency jitter exceeds a predetermined jitter threshold includes determining whether the determined frequency jitter exceeds the predetermined jitter threshold within a specific time period.

11. A frequency offset correction system for correcting frequency offset in a dual comb spectroscopy system, said frequency offset correction system comprising:
   a first laser (L1) generator configured to transmit L1 pulses at a repetition rate of a first frequency;
   a second laser (L2) generator configured to transmit L2 pulses at a repetition rate of a second frequency, the second frequency different from the first frequency;
   a first combiner configured to combine a first portion of the L1 pulses and a first portion of the L2 pulses to interrogate a reference material;
   a reference detector configured to capture reference material pulses that include a combination of the first portion of the L1 pulses and the first portion of the L2 pulses that interrogated the reference material;
   an interrogation detector configured to capture material of interest pulses that include a second portion of the L1 pulses that interrogated the material of interest; and
   a controller configured to cause the first laser generator and the second laser generator to correct for frequency offset the L1 pulses and the L2 pulses, respectively, based on the captured reference material pulses and the captured material of interest pulses.

12. The frequency offset correction system of claim 11, wherein said interrogation detector interrogates the material of interest using the second portion of the power of the L1 pulses, wherein the second portion is 70-100%.

13. The frequency offset correction system of claim 11, wherein said interrogation detector interrogates the reference material using a combination of the first portion of the power of the L1 pulses and the first portion of the power of the L2 pulses, wherein the first portion of the power of the L1 pulses is 0-30% and the first portion of the power of the L2 pulses is 0-30%.

14. The frequency offset correction system of claim 11, wherein said interrogation detector interrogates the reference material at a predetermined concentration and a predetermined pressure.

15. The frequency offset correction system of claim 11, wherein said controller determines the frequency jitter by transforming a plurality sections of the captured reference cell pulses and by cross-correlating each section with a first of the plurality of section of the capture reference cell pulses.

16. The frequency offset correction system of claim 15, wherein said controller is further configured to apply the determined frequency jitter to the combination of the captured material of interest pulses and a second portion of the L2 pulses.

17. The frequency offset correction system of claim 16, wherein said controller is further configured to determine whether the determined frequency jitter exceeds a predetermined jitter threshold.

18. The frequency offset correction system of claim 17, wherein said controller is further configured to cause a change in a pump power of said first laser generator in response to the determined frequency jitter exceeded the predetermined jitter threshold.

19. The frequency offset correction system of claim 17, wherein said controller is further configured to cause a change in a pump power of said second laser generator in response to the determined frequency jitter exceeded the predetermined jitter threshold.

20. A controller for correcting frequency offset in a dual comb spectroscopy system, said controller including a processor coupled to a memory device, said controller is configured to correct frequency offset by:
   causing a first laser (L1) generator to transmit L1 pulses at a repetition rate of a first frequency;
   causing a second laser (L2) generator to transmit L2 pulses at a repetition rate of a second frequency, the second frequency different from the first frequency;
   capturing reference cell pulses that include the combination of the first portion of the L1 pulses and the first portion of the L2 pulses that interrogated a reference material;
   capturing material of interest pulses that include the second portion of the L1 pulses that interrogated a material of interest;
   determining a frequency jitter based on the captured reference cell pulses and the combination of the captured material of interest pulses and a second portion of the L2 pulses;
   determining whether the determined frequency jitter exceeds a predetermined jitter threshold, and
   in response to the determined frequency jitter exceeded the predetermined jitter threshold, causing a change in at least one of the following a pump power of the first laser generator and a pump power of the second laser generator.

* * * * *